(12) United States Patent
Li et al.

(10) Patent No.: US 12,448,328 B2
(45) Date of Patent: Oct. 21, 2025

(54) GYPSUM PANEL CONTAINING AMMONIUM-EXCHANGED VERMICULITE AND METHODS

(71) Applicant: KNAUF GIPS KG, Iphofen (DE)

(72) Inventors: Qinghua Li, Rolling Meadows, IL (US); Mark Hemphill, Hawthron Woods, IL (US)

(73) Assignee: KNAUF GIPS KG, Iphofen (DE)

( * ) Notice: Subject to any disclaimer, the term of this patent is extended or adjusted under 35 U.S.C. 154(b) by 517 days.

(21) Appl. No.: 17/948,710

(22) Filed: Sep. 20, 2022

(65) Prior Publication Data

US 2023/0250019 A1 Aug. 10, 2023

Related U.S. Application Data

(60) Provisional application No. 63/307,818, filed on Feb. 8, 2022.

(51) Int. Cl.
| | |
|---|---|
| *C04B 11/28* | (2006.01) |
| *C01B 33/42* | (2006.01) |
| *C04B 14/20* | (2006.01) |
| *C04B 28/14* | (2006.01) |
| *C04B 111/00* | (2006.01) |
| *C04B 111/40* | (2006.01) |

(52) U.S. Cl.
CPC ....... *C04B 11/28* (2013.01); *C04B 2111/0062* (2013.01); *C04B 2111/40* (2013.01)

(58) Field of Classification Search
None
See application file for complete search history.

(56) References Cited

U.S. PATENT DOCUMENTS

| | | | |
|---|---|---|---|
| 2,078,199 A | 4/1937 | King | |
| 2,526,066 A | 10/1950 | Croce | |
| 3,243,369 A | 3/1966 | Dekking | |
| 3,410,655 A | 11/1968 | Rutter et al. | |
| 3,573,947 A | 4/1971 | Kinkade et al. | |
| 4,305,992 A | 12/1981 | Langer et al. | |
| 4,366,204 A | 12/1982 | Briggs | |

(Continued)

FOREIGN PATENT DOCUMENTS

| | | |
|---|---|---|
| EP | 0176649 A1 | 4/1986 |
| JP | S48 70716 A | 9/1973 |

(Continued)

OTHER PUBLICATIONS

PCT Search Report dated Jul. 3, 2023 for PCT Application No. PCT/US2023/061945.

*Primary Examiner* — David Sample
(74) *Attorney, Agent, or Firm* — Greer, Burns & Crain, Ltd; Philip T. Petti; Pradip Sahu

(57) ABSTRACT

This disclosure provides products useful as construction materials and containing set gypsum and ammonium-exchanged vermiculite, including a gypsum panel having a gypsum core comprising set gypsum and ammonium-exchanged vermiculite and characterized by decreased heat shrinkage and increased resistance to fire damage in comparison to the gypsum panel that comprises vermiculite that has not been ammonium-exchanged. The disclosure further relates to methods for producing the gypsum panel and constructing building assemblies with the gypsum panels, including walls and ceilings.

18 Claims, 3 Drawing Sheets

(56) References Cited

U.S. PATENT DOCUMENTS

| | | |
|---|---|---|
| 5,116,537 A | 5/1992 | Yang et al. |
| 5,326,500 A | 7/1994 | Friedman et al. |
| 5,340,558 A | 8/1994 | Friedman et al. |
| 5,643,510 A | 7/1997 | Sucech |
| 5,683,635 A | 11/1997 | Sucech et al. |
| 5,798,425 A | 8/1998 | Albrecht et al. |
| 6,409,825 B1 | 6/2002 | Yu et al. |
| 6,494,609 B1 | 12/2002 | Wittbold et al. |
| 6,777,517 B1 | 8/2004 | Albrecht et al. |
| 6,874,930 B2 | 4/2005 | Wittbold et al. |
| 7,754,006 B2 | 7/2010 | Liu et al. |
| 7,767,019 B2 | 8/2010 | Liu et al. |
| 7,803,226 B2 | 9/2010 | Wang et al. |
| 7,892,472 B2 | 2/2011 | Veeramasuneni et al. |
| 8,323,785 B2 | 12/2012 | Yu et al. |
| 8,343,273 B1 | 1/2013 | Lettkeman et al. |
| 9,249,578 B2 | 2/2016 | Negri et al. |
| 2010/0313786 A1 | 12/2010 | Eversdijk et al. |
| 2011/0147682 A1 | 6/2011 | Bown et al. |
| 2012/0238096 A1 | 9/2012 | Xiong et al. |
| 2013/0068364 A1* | 3/2013 | Yu .......... B32B 38/164 |
| | | 156/43 |
| 2013/0330532 A1 | 12/2013 | Dierschke et al. |
| 2021/0060816 A1 | 3/2021 | Yu et al. |

FOREIGN PATENT DOCUMENTS

| | | | |
|---|---|---|---|
| JP | 55144458 A * | 11/1980 | ............ C04B 14/10 |
| JP | 2004182515 A2 | 7/2004 | |
| JP | 5099412 B2 | 12/2012 | |
| JP | 6795802 B2 | 12/2020 | |
| WO | 2010147147 | 12/2010 | |
| WO | WO 2022/233455 A1 | 11/2022 | |

* cited by examiner

GYPSUM PANEL CONTAINING AMMONIUM-EXCHANGED VERMICULITE AND METHODS

CROSS-REFERENCE TO RELATED APPLICATIONS

This application claims the benefit of priority to U.S. Provisional Patent Application 63/307,818 filed Feb. 8, 2022, the entire disclosure of which is herein incorporated by reference in its entirety.

TECHNICAL FIELD

This disclosure relates to products suitable as construction materials and containing set gypsum and ammonium-exchanged vermiculite, including gypsum panels characterized by decreased heat shrinkage and increased resistance to fire damage, especially wallboard and acoustical ceiling tiles, and building assemblies with the gypsum panels as well as methods.

BACKGROUND

Products that contain a gypsum core composed of set gypsum, preferably intermixed with one or more additives, are commonly used in construction, including as panels in walls and ceilings. Exemplary gypsum panels include an acoustical tile, a fiberboard, a glass-mat gypsum panel, a gypsum core which may be further coated with one or more coatings and/or paints, and a wallboard in which a gypsum core is typically sandwiched between two paper cover sheets, a face cover sheet and a back cover sheet.

Given their wide use in building construction, there is a need in the field for fire-resistant gypsum panels which are capable of withstanding high temperatures without structural collapse for a period of time specified by building code regulations.

Vermiculite is a hydrated magnesium aluminum silicate mineral commercially available in several different basic particle sizes, referred in the U.S. as grades 1 through 5. When subjected to heat, vermiculite expands into incombustible and highly absorbent particles.

U.S. Pat. No. 8,323,785 discloses a fire-resistant gypsum panel comprising a gypsum core disposed between two cover sheets, the gypsum core comprising high expansion particles having a volume expansion of about 300% or more of their original volume for Grade 4 vermiculite after being heated for about one hour at about 1560° F.

U.S. patent publication 2021/0238096 notes that using vermiculite in amounts necessary for supporting sufficient fire-resistance may not be an environmentally sustainable practice because of the limited supply of vermiculite ore in nature. This patent publication proposes reducing an amount of vermiculite by replacing a portion of vermiculite with graphite, perlite, or any combination thereof.

There remains the need in the field for fire-resistant gypsum panels, especially for fire-rated gypsum panels produced by environmentally sustainable methods.

SUMMARY

This disclosure addresses the need for producing fire-resistant gypsum panels in an environmentally sustainable manner by formulating a gypsum core comprising ammonium-exchanged vermiculite, resulting in production of fire-resistant gypsum panels with a lesser amount of vermiculite.

Gypsum panels according to this disclosure may be formed with ammonium-exchange vermiculite. These gypsum panels are characterized by a decreased heat shrinkage and increased resistance to fire damage when compared to gypsum panels having the same amount of vermiculite which is not ammonium-exchanged.

In one aspect, this disclosure relates to a gypsum panel having a gypsum core comprising set gypsum and ammonium-exchanged vermiculite,
- wherein the gypsum core has a width (x), a length (y) and a thickness (z),
- wherein the length (y) and the width (x) are greater than the thickness (z),
- wherein the length (y) is greater than the width (x),
- wherein the gypsum core has two long surfaces, a first long surface of a width-length (x-y) area and an opposite second long surface of the width-length (x-y) area, and
- wherein each of the two long surfaces has four edges, including a first long edge of the length (y) and a second long edge of the length (y), the second long edge being opposite to the first long edge.

The gypsum core may be formed from at least one gypsum slurry,
- wherein the gypsum slurry comprises water, calcined gypsum in an amount from 40% to 70% by weight of the slurry, ammonium-exchanged vermiculite in an amount from 2% to 10% by weight of calcined gypsum, and one or more additives, or
- wherein the gypsum slurry comprises water, calcined gypsum in an amount from 40% to 70% by weight of the slurry, vermiculite in an amount from 2% to 10% by weight of calcined gypsum, one or more additives, and one or more of ammonium salt, ammonium hydroxide and/or urea in a weight ratio to vermiculite ranging from 1:5 to 1:50; and
- wherein a water-to-stucco ratio in the gypsum slurry is from 0.5 to 1.5.

The gypsum core may contain ammonium-exchanged vermiculite of Grade 4, Grade 5, or any combination thereof.

In some embodiments, the gypsum core may be covered on at least one of the two long surfaces with a cover sheet, preferably the cover sheet being a paper cover sheet or a fiberglass mat. Some preferred embodiments of the gypsum panel according to this disclosure include those wherein the gypsum core is covered on the first long surface with a first paper cover sheet and the gypsum core is covered on the second long surface with a second paper cover sheet, and wherein the first paper cover sheet and the second paper cover sheet are attached to the gypsum core.

The gypsum panels according to this disclosure include those wherein the gypsum core has the thickness (z) of ⅝ inch, and wherein the gypsum core has less than 5% thermal shrinkage in the z-direction, as measured in a thermal shrinkage test conducted in accordance with ASTM C 1795-15 at 850° C. for one hour. The gypsum panels according to this disclosure also include those gypsum panels which are fire rated.

In some preferred embodiments, the gypsum core may have a density in the range from 30 pounds per cubic foot (pcf) to 40 pounds per cubic foot (pcf).

In some preferred embodiments, at least two long edges of the gypsum core may be tapered.

The gypsum panels according to this disclosure may have the thickness (z) in range from ¼ inch to 1 inch.

Particularly preferred gypsum panels of this disclosure include fire-resistant wallboard with a thermal insulation index (TI) of at least 20 minutes, as measured in accordance with ASTM C 1795-15.

The additives in the gypsum panel may include starch, fibers, a dispersant, a foaming agent, a set accelerating agent, a phosphate compound, a set retarding agent or any combination thereof. In particular, the gypsum slurry may include a foaming agent, water repellant or any combination thereof.

Particularly preferred gypsum panels include those, wherein the gypsum core contains air voids.

In another aspect, this disclosure relates to methods for making a gypsum panel having a gypsum core comprising set gypsum and ammonium-exchanged vermiculite. These methods comprise:
a) mixing a gypsum slurry with calcined gypsum, water and additives;
b) adding to the gypsum slurry ammonium-exchanged vermiculite or adding to the gypsum slurry vermiculite and one or more of ammonium salt, ammonium hydroxide and/or urea;
c) depositing the gypsum slurry on a first cover sheet; and
d) covering the deposited gypsum slurry with a second cover sheet.

Preferably, the methods further comprise before step b), ion-exchanging vermiculite in a solution comprising one or more of ammonium salt, ammonium hydroxide and/or urea and thereby obtaining ammonium-exchanged vermiculite. More preferably, after the ion-exchanging reaction is completed, the method may further comprise one or more of the following steps: separating ammonium exchanged vermiculite from the solution and/or drying ammonium-exchanged vermiculite.

In any of the methods, the additives may include one or more of the following: starch, foam, fibers, a dispersant, a phosphate compound, a set retarding agent, a set accelerating agent, or any combination thereof.

Some preferred embodiments of the methods include those, wherein the first cover sheet and/or the second cover sheet are paper cover sheets.

In yet another aspect, this disclosure relates to a wall or ceiling assembly comprising at least one gypsum panel according to this disclosure, wherein the gypsum panel is attached to a substrate.

DETAILED DESCRIPTION

In one aspect, this disclosure relates to a gypsum panel having a gypsum core comprising set gypsum intermixed with ammonium (NH4+)-exchanged vermiculite. Particularly preferred embodiments include gypsum panels having a gypsum core containing ammonium-exchanged vermiculite in an amount from 2% to 10% by weight of calcined gypsum, e.g., 2 to 10 grams of ammonium-exchanged vermiculite per 100 grams of calcined gypsum.

The gypsum panels according to this disclosure can meet or even exceed requirements for heat shrinkage and resistance to fire damage with lesser amounts of ammonium-exchanged vermiculite in comparison to gypsum panels with gypsum cores formulated with conventional vermiculite that has not been ammonium-exchanged. Very importantly, the gypsum panels according to this disclosure formed with ammonium-exchange vermiculite are characterized by a decreased heat shrinkage and increased resistance to fire damage when compared to gypsum panels having the same amount of vermiculite which is not ammonium-exchanged.

In this disclosure, a "gypsum panel" includes any panel having a gypsum core composed of at least set gypsum and ammonium-exchanged vermiculite. The gypsum core may further contain and preferably does contain one or more additives, including, but not limited to, fibers, a polymeric binder and/or starch, a dispersant, a bulking compound, a set retarding agent, a set accelerating agent, a biocide, a water-repellant, a foaming agent, and/or any combination thereof.

Non-limiting examples of gypsum panels include an acoustical tile, a fiberboard, a fiberglass-mat gypsum panel and a wallboard in which a gypsum core is sandwiched between two paper cover sheets, a face cover sheet and a back cover sheet. Preferably, the gypsum panels of this disclosure are wallboards, including light-weight wallboards and/or light weight glass-mat gypsum panels which are made with foam. This wallboard and gypsum panels may be referred in this disclosure as a gypsum panel having a foamed gypsum core.

Figure 1:
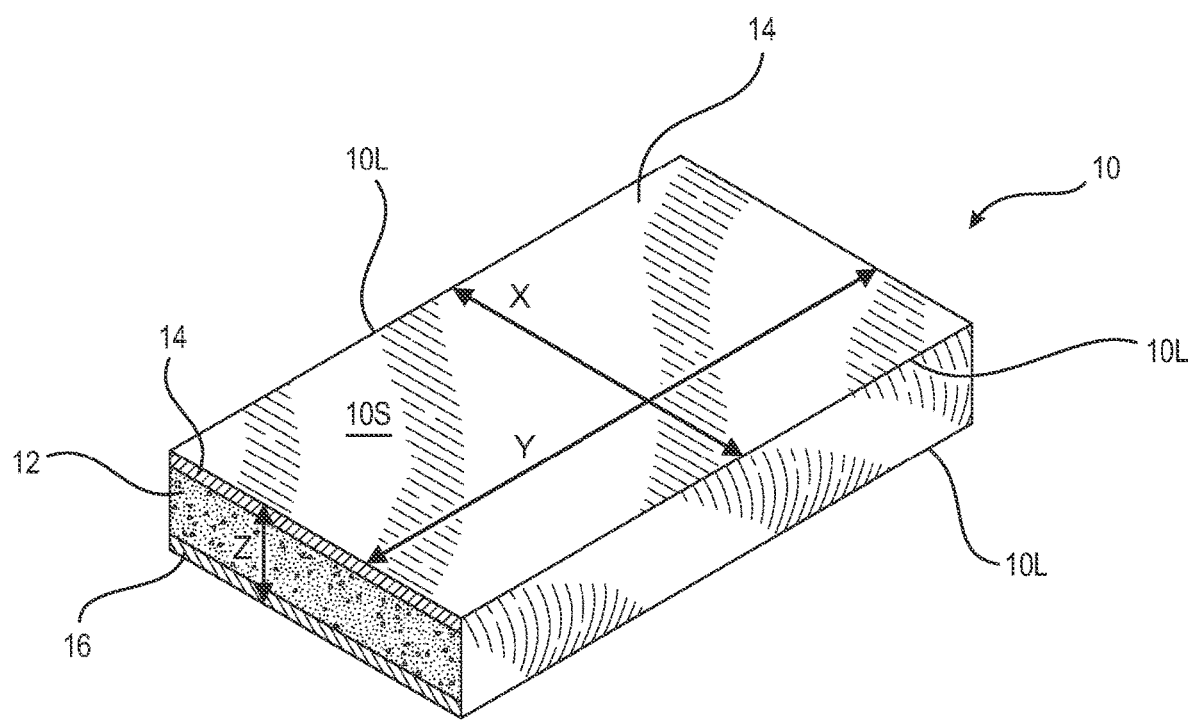
FIG. 1 is a perspective view of one embodiment of a gypsum panel according to this disclosure. This illustration is not drawn to scale.

Referring to FIG. 1, it is a perspective view of one embodiment of a gypsum panel according to this disclosure, generally 10. Gypsum panel 10 may be substantially rectangular in its shape and has a width (x), a length (y) and a thickness (z). In some preferred embodiments, a value of length (y) is greater than a value of width (x) and accordingly, the panel 10 has 4 long edges of the (y) length, three of which are shown in FIG. 1 as 10L. In this disclosure, a direction across the length (y) may be referred to as the longitudinal direction, a direction across the width (x) may be referred to as the long transverse direction, and a direction through the thickness (z) may be referred to as the short transverse direction.

Embodiments of gypsum panel 10 include panels of various thickness, width and length, and these dimensions can be adjusted as needed. Gypsum panels typically vary in thickness (z) from about ¼ inch to about one inch, depending on their expected use and application. Gypsum panels may include those with a length (y) in the range of 8 to 16 ft., e.g., 8 ft, 10 ft or 16 ft (2438-4877 mm), a width (x) of 4 ft. (1219 mm) or 54 in. (1372 mm). Any of these panels can have a thickness from about ¼ inch to about one inch, with some preferred embodiments having a thickness (z) of ⅝ inch (15.9 mm). Gypsum panels 10 of other dimensions are also envisioned.

In this disclosure, "about" means plus-minus 5% of the specified numeric value, e.g. "about 100" means 100±5.

The gypsum panel 10 has two long surfaces for the width-length (x-y) area, a first of these long surfaces is shown as 10S in FIG. 1. A second long surface, 10S", is opposite to the first long surface 10S and is not visible in FIG. 1. The first long surface 10S is called a face surface as it is typically visible to a dweller when the gypsum panel 10 is installed as a wall or ceiling. The second long surface 10S" is called a back surface as it typically faces studs.

In some embodiments of gypsum panel 10, a gypsum core 12 is sandwiched between two cover sheets, a first cover sheet or a facer, 14, applied over the first long surface 10S and a second cover sheet or a backer, 16, applied over the second long surface 10S'. In other embodiments, the gypsum panel 10 may not have cover sheet 14 and/or cover sheet 16. If at least one of the cover sheets 14 and 16 is present, either cover sheet 14 or 16, or both, may be a paper cover sheet or a fiberglass mat. In some preferred embodiments, cover sheet 14 and cover sheet 16 are paper cover sheets.

The first cover sheet, 14, may be referred to as a face cover sheet or a facer and the second cover sheet, 16, may be referred to as a back cover sheet or a backer. The gypsum core 12 is bound to the cover sheets 14 and 16. In some preferred embodiments of this disclosure, the gypsum panel 10 is a wallboard comprising the gypsum core 12 disposed (sandwiched) between and attached to the face paper sheet 14 and the back paper sheet 16. In some embodiments, the gypsum core 12 may be laminated with a coating and/or an additional gypsum slurry layer on at least a portion of at least one of long surfaces 10S and 10S'. Any of the coatings and/or additional gypsum slurry layers can be helping with attaching (adhering) the gypsum core 12 to the face paper cover sheet 14 and/or the back paper cover sheet 16.

In some embodiments of the gypsum panel 10, the face paper cover sheet or glass mat 14 may be folded around the long edges 10L to reinforce and protect the gypsum core 12, and the ends of the cover sheet 14 may be cut square and even. In some embodiments, at least some of the long edges 10L may be tapered, allowing panel joints to be reinforced and concealed during installation. The gypsum panel 10 may further comprise one or more coatings (not shown in FIG. 1) that can be applied over the gypsum core 12 and/or at the edges of the gypsum panel 10 for example in order to improve binding of the gypsum core 12 to the cover sheets 14 and/or 16 and/or to improve the strength of the panel edges. In some embodiments, a coating, e.g., a paint and/or water-resistant coating, may be also applied over the external surface (not in contact with the surface of the gypsum core) of the cover sheet 14 and/or cover sheet 16.

In this disclosure, the gypsum core 12 contains set gypsum and ammonium-exchanged vermiculite, and preferably, the gypsum core 12 may contain one or more other additives as discussed in more detail below.

The gypsum panels according to the present disclosure can be formed from a gypsum slurry in which calcined gypsum (stucco) hardens (sets) by reacting with water. Suitable calcined gypsum (stucco) can be obtained by calcining naturally occurring gypsum and/or synthetic gypsum.

Gypsum is a natural mineral containing calcium sulfate dihydrate ($CaSO_4 \cdot 2H_2O$). Depending on a gypsum source, gypsum may comprise 90 to 95% pure calcium sulfate dihydrate.

Depending on a gypsum source and/or a method of calcining, calcined gypsum (calcium sulfate hemihydrate, $CaSO_4 \cdot \frac{1}{2}H_2O$) may contain alpha calcium sulfate hemihydrate, beta calcium sulfate hemihydrate, or any combination thereof. Methods for producing calcined gypsum from gypsum and synthetic gypsum are known in the art, including methods disclosed in U.S. Pat. Nos. 3,410,655, 7,754,006 and 8,343,273, the entire disclosures of which are herein incorporated by reference.

Calcined gypsum may contain some minor amounts of other minerals, e.g., clay and/or calcium carbonate. In addition to calcined gypsum or instead of calcined gypsum, the gypsum core 12 in the gypsum panel 10 may comprise set synthetic gypsum produced as a by-product of fossil-fueled power plants.

When calcined (synthetic and/or natural) gypsum is mixed with water into a gypsum slurry, calcium sulfate hemihydrate re-hydrates and calcined gypsum sets and hardens into a crystalline matrix, producing a set gypsum core. Depending on a gypsum panel type, the gypsum core 12 may comprise up to 95% wt of set gypsum.

Ammonium-exchanged vermiculite can be obtained by ion-exchanging vermiculite in an aqueous solution containing a source of ammonium ions such as an ammonium salt, ammonium hydroxide ($NH_4OH$) and/or urea ($NH_2CONH_2$). Suitable salts are organic and inorganic salts, including, but not limited to, ammonium dihydrogen phosphate ($NH_4H_2PO_4$, "ADP"), ammonium monohydrogen phosphate (($NH_4)_2HPO_4$, "AMP"), ammonium phosphate (($NH_4)_3PO_4$, "AP"), ammonium sulfate (($NH_4)_2SO_4$), ammonium carbonate (($NH_4)_2CO_3$), ammonium acetate ($NH_4CH_2CHOO$), or any combination thereof.

Various methods can be used in order to obtain ammonium-exchanged vermiculite suitable for formulating a gypsum core according to this disclosure. In some preferred embodiments, vermiculite of any grade, and preferably of U.S. Grade 4 and/or 5, can be mixed with an aqueous solution containing an ammonium salt, ammonium hydroxide ($NH_4OH$) and/or urea ($NH_2CONH_2$) and incubated in the solution for a period of time ranging from about 2 minutes to about 2 days and more preferably for about 5 minutes to about 10 hours, preferably with shaking and/or stirring. The ammonium sat, ammonium hydroxide and/or urea concentration in the solution may be in the range 1 and 40%.

The solution may contain 1 part by weight of the ammonium salt, ammonium hydroxide and/or urea per 5 to 50 parts by weight of vermiculite. A total volume of an ammonium-exchanging solution can be adjusted such that all or substantially all vermiculite particles are immersed into the ammonium-exchanging solution. In some preferred embodiments, the ratio of the ammonium-exchange solution by volume to vermiculite may be in the range from 1:0.1 to 1:10, e.g., 1:0.5; 1:1 or 1:5.

Preferred concentrations for ammonium-exchanging solutions may be in the range from about 1% to about 40% by weight and more preferably from about 1% to about 10% by weight, e.g., 2.5%, 5% or 7.5% by weight, of an ammonium salt, ammonium hydroxide and/or urea. Most preferred aqueous ammonium-exchanging solutions include those comprising 2.5% to 7.5% by weight of one or more ammonium salts.

This ion-exchanging reaction can be conducted in the range from 19° C. to 50° C., preferably in the range from 19° C. to 30° C. A person of skill will also recognize obvious modifications, including increasing or decreasing the temperature, increasing or decreasing a salt concentration, and/or increasing or decreasing the incubation time.

After the ion-exchanging reaction is completed, ammonium-changed vermiculite can be filtered from the solution and optionally at least partially dried, preferably at an elevated temperature, e.g., in the range from 90° F. to 120° F. for a period of time, preferably for 0.5 to 12 hours. Or, in alternative, ammonium-exchanged vermiculite can be added into a gypsum slurry without drying.

In yet another embodiment, a gypsum core according to this disclosure can be made from a gypsum slurry comprising calcined gypsum, water, vermiculite and an ammonium salt, ammonium hydroxide and/or urea, and optionally any other additives typically used in manufacturing gypsum cores. In these embodiments, vermiculite is ion-exchanged into ammonium-exchanged vermiculite directly in the gypsum slurry and while the gypsum slurry is getting mixed, distributed and formed into a gypsum core. In these embodiments, a gypsum slurry may contain from 2% to 10% of vermiculite by weight of calcined gypsum. In the gypsum slurry, an ammonium salt, ammonium hydroxide and/or urea can be used in the following ratio: one part of dry powder (ammonium salt, ammonium hydroxide and/or urea) per 5 to 50 parts of vermiculite. Suitable organic and inorganic ammonium salts include, but not limited to, ammonium dihydrogen phosphate ($NH_4H_2PO_4$, "ADP"), ammonium monohydrogen phosphate (($NH_4)_2HPO_4$, "AMP"), ammonium sulfate (($NH_4)_2SO_4$), ammonium carbonate (($NH_4)_2CO_3$), ammonium acetate ($NH_4CH_2CHOO$), or any combination thereof. Is some preferred embodiments, a combination of ammonium dihydrogen phosphate ($NH_4H_2PO_4$, "ADP") and ammonium sulfate (($NH_4)_2SO_4$) can be used. Ammonium sulfate and ADP can be used in any proportion to each other, and preferably in the ratio range from 10:1 to 1:10 by weight, respectively.

In this disclosure, suitable gypsum slurries include those in which a water-to-calcined gypsum ratio by weight (known as the water-to-stucco ratio, WSR) is in the range from 0.5 to 1.5, preferably from 0.5 to 1.3, more preferably from 0.7 to 1, and most preferably from 0.7 to 1.3, e.g., 0.7, 0.8, 0.9, 1, 1.1, 1.2 or 1.3.

In this disclosure, a gypsum slurry may comprise from 40% to 70% by weight of calcined gypsum.

Ammonium-exchanged vermiculite according to this disclosure is expandable when exposed to heat, and more specifically when exposed to 850° C. known as a thermal test, ammonium-exchanged vermiculite may produce a volume expansion of 300% or even higher than 300%. Very importantly, it was discovered in comparative thermal expansion tests that ammonium-exchanged vermiculite may produce a volume expansion larger than vermiculite that has not been ammonium-exchanged. It was discovered that ammonium-exchanged vermiculite can expand at least 5% and preferably at least 10% larger by volume in comparison to vermiculite that has not been ammonium-exchanged.

In this disclosure, grades of vermiculite may be determined based on a percentage of particles by weight retained on a sieve with openings of a predetermined size. A person of skill will recognize the following U.S. sieve numbers and their corresponding opening sizes.

TABLE 1

U.S. Sieve Numbers

| U.S. Sieve Designation Number | Size of Opening (mm) |
| --- | --- |
| 20 | 0.841 |
| 30 | 0.595 |
| 40 | 0.420 |
| 50 | 0.297 |
| 70 | 0.210 |
| 100 | 0.149 |

Grade 4 vermiculite includes vermiculite with particle sizes wherein from 25% to 60% of particles by weight are retained on a No. 40 sieve (0.420 mm openings) or a No. 50 sieve (0.297 mm openings), with the remaining passed-through 25% of particles by weight being retained on a No. 70 sieve (0.210 mm openings) and then the remaining passed-through 15% of particles by weight being retained on a No. 100 sieve (0.149 mm opening). Grade 4 includes vermiculite with 90% by weight of particles being smaller than 0.841 mm and 25% to 60% by weight of particles being larger than 0.420 mm, as can be determined by sieving particles through a No. 20 (0.841 mm openings) sieve and then sieving passed-through particles through a No. 40 (0.420 mm opening) sieve and weighing particles that were retained on each of the sieves.

Grade 5 vermiculite includes vermiculite with particle sizes, wherein 30% to 76% of particles by weight are retained on a No. 100 sieve (0.149 mm openings) and 20% of particles by weight are retained on a No. 50 sieve (0.297 mm openings). Grade 5 vermiculite includes vermiculite with 30% to 76% of particles by weight being larger than 0.149 mm and no more than 20% of particles being larger than 0.297 mm, as determined by sieving the particles through a No. 50 sieve (0.297 mm openings) and then sieving passed-through particles through a No. 100 sieve (0.149 mm openings) and weighing particles that were retained on each of the sieves.

Gypsum panels according to this disclosure include those in which a gypsum core contains ammonium-exchanged vermiculite produced from vermiculite with larger particles such as for example, Grade 4 vermiculite. Suitable ammonium-exchanged vermiculite in the gypsum core of this disclosure includes vermiculite in which 40% to 80% by weight, preferably about 55% to about 65% by weight, and most preferably about 60% of vermiculite particles by weight from vermiculite total have a size in the range from 0.297 mm to 0.420 mm, as determined by sieving the particles through a No. 40 sieve (0.420 mm openings), collecting particles that passed through the sieve and then sieving them through a No. 50 sieve (0.297 mm openings). In some embodiments, the gypsum panel according to this disclosure may comprise a gypsum core which contains ammonium-exchanged vermiculite of Grade 4, Grade 5, or any combination thereof.

One of the technical advantages of the present methods according to this disclosure is that a fire-resistant gypsum panel can be obtained with ammonium-exchanged vermiculite of different grades, including larger particles such as for example as ammonium-exchanged vermiculite which contains particles ranging in sizes from about 0.297 mm to about 0.841 mm, and preferably containing particles which are ranging in sizes from about 0.420 mm to about 0.841 mm, as can be determined by sieving particles through sieves listed in Table 1.

Gypsum panels according to this disclosure include fire-resistant gypsum wallboard, such as ULX and ULIX (ultra-light) gypsum panels, or any fire-resistant gypsum panels comprising ammonium-exchanged vermiculite.

These gypsum panels comprise a gypsum core containing a set gypsum intermixed with various additives and ammonium-exchanged vermiculite, preferably an amount of ammonium-exchanged vermiculite being in the range from 2% to 10% by weight of calcined gypsum. The additives may include, but are not limited to, one or more of the following: starch, fibers, a dispersant, a foaming agent, a phosphate compound and/or agents that accelerate or delay a setting reaction in a gypsum slurry.

"High Temperature (Thermal) Shrinkage" of a gypsum core can be measured in accordance with ASTM C 1795-15, wherein the gypsum core is heated at about 1560° F. (850° C.) for one hour. Thermal shrinkage can be measured as a percentage from a pre-test gypsum core thickness value (z-shrinkage or z-direction shrinkage) and as a percentage from a pre-test gypsum core value for the x-y (width-length) area (x-y shrinkage or x-y-direction shrinkage).

It has been discovered that wallboards having a gypsum core that contains ammonium-exchanged vermiculite according to this disclosure, including foamed wallboards, have a reduced z-direction shrinkage in comparison to wallboards that comprise vermiculite which was not ammonium-exchanged. When a thermal shrinkage test was conducted in accordance with ASTM C 1795-15 at about 1560° F. (850° C.) for one hour on a gypsum core with a ⅝ inch thickness, the z-direction shrinkage was less than 6% and more preferably less than 5% in some embodiments of a gypsum core containing ammonium-exchanged vermiculite according to this disclosure.

Having a high temperature shrinkage of 10% or less in the z-direction (as measured in accordance with ASTM C 1795-15) wherein the gypsum core is heated at about 1560° F. (850° C.) for one hour is indicative that this gypsum panel will pass fire tests provided in ASTM E 119 using an assembly constructed in accordance with UL U305, U419, and U423. Thus, this disclosure provides gypsum panels that can be fire-rated.

Having formulated a gypsum core with ammonium-exchange vermiculite according to this disclosure permits producing fire-resistant wallboard with a thermal insulation index (TI) of at least 20 minutes, 30 minutes or greater, when measured in accordance with ASTM C 1795-15. The wallboard may include gypsum panels with a gypsum core of reduced density, e.g., about 40 pound per cubic foot (pcf) or less and preferably, about 35 pcf or less. Some preferred gypsum panels according to this disclosure may have a gypsum core density in the range from 30 pcf to 40 pcf, and more preferably from 32 pcf to 38 pcf, and most preferably from 35 pcf to 37 pcf.

In gypsum panels according to this disclosure, a gypsum core can be formed from a gypsum slurry containing calcined gypsum (stucco, calcium sulfate hemihydrate), water, ammonium-exchanged vermiculite and one or more additives as used in gypsum cores and gypsum slurries. Examples of additives include, but are not limited to, binders, fibers, set accelerators, set retarders, dehydration inhibitors, adhesives, bulking agents, dispersants, thickeners, bactericides, fungicides, pH adjusters, leveling or non-leveling agents, water repellants, colorants, aqueous foams or any combination thereof. In the embodiments, wherein vermiculite is ammonium-exchanged directly in a gypsum slurry, the gypsum slurry may be formulated with vermiculite and one or more of ammonium salt, ammonium hydroxide and/or urea which can be used in an amount of about one part by weight of one or more of ammonium salt, ammonium hydroxide and/or urea per about 5 to about 50 parts by weight of vermiculite.

The gypsum cores and gypsum slurries according to this disclosure may comprise one or more starches, including raw starch, hydroxyethylated starch, acid-modified starch, pregelatinized starch or any combination thereof. In some embodiments, starch may include pregelatinized starch which can be obtained by cooking and gelatinizing raw starch in water, for example at a temperature of about 185° F., or higher. A pregelatinized starch can be added to the gypsum slurry in a dry form and/or in a predispersed liquid form. Commercially available pregelatinized starches include corn flour starch. Suitable starches may also include acid-modified starch, e.g., acid-modified corn starch and/or hydroxyethylated starch. Suitable non-gelatinized starches may include commercially available wheat starch. The gypsum slurries and gypsum cores of this disclosure may comprise from 0.1% to 5% of starch, preferably from about 0.2% to about 2% of starch by weight of calcined gypsum.

The gypsum cores and gypsum slurries according to this disclosure may comprise fibers. Depending on an application, fibers may include mineral wool fibers, glass fibers, carbon fibers, cellulose fibers or any combination thereof. Some preferred embodiments include those in which glass fibers, preferably E-glass fibers are used. Typically, suitable glass fibers may have an average length in the range from 0.5 to 0.76 inches and a diameter of about 11 to about 17 microns. The gypsum slurries and gypsum cores of this disclosure may comprise from about 0.1% to about 2% of fibers by weight of calcined gypsum, preferably from about 0.2% to about 1% of fibers by weight of calcined gypsum.

The gypsum cores and gypsum slurries according to this disclosure may comprise one or more of phosphate compounds which are used for increasing gypsum core strength, especially while a gypsum panel is still setting in order to improve wet (green) strength and sag resistance of the gypsum panel. Suitable phosphate compounds include cyclic polyphosphates, condensed phosphoric acids, and monobasic salts or monovalent ions of orthophosphates. Particularly preferred phosphate compounds include, but are not limited to, trimetaphosphate salts and tetrametaphosphate salts. Particularly preferred phosphate compounds include sodium trimetaphosphate ("STMP"), potassium trimetaphosphate, ammonium trimetaphosphate, sodium hexametaphosphate, tetrapotassium tripolyphosphate, ammonium polyphosphate, aluminum trimetaphosphate or any combination thereof. The gypsum slurries and gypsum cores of this disclosure may comprise from about 0% to about 1% of one or more phosphate compounds by weight of calcined gypsum, preferably from about 0% to about 1% of one or more phosphate compound by weight of calcined gypsum.

The gypsum cores and gypsum slurries according to this disclosure may comprise one or more dispersants. Suitable dispersants include naphthalenesulfonates and derivatives, including sodium and/or calcium naphthalenesulfonate. Other suitable dispersants include polycarboxylate dispersants and in particular, polycarboxylic ethers, including those described in U.S. Pat. Nos. 5,798,425, 6,777,517 and 7,767,019. Some gypsum slurries may also comprise one or more lignosulfonates. The gypsum slurries and gypsum cores of this disclosure may comprise from about 0.05% to about 2% of one or more dispersants by weight of calcined gypsum, preferably from about 0.1% to about 1% of one or more phosphate compound by weight of calcined gypsum.

The gypsum cores and gypsum slurries according to this disclosure may comprise one or more set retarding and/or accelerating agents. These are compounds that modify a rate at which a gypsum slurry sets.

Preferred examples of set accelerating agents include "CSA" which may contain about 95% of calcium sulfate dihydrate co-ground with 5% sugar and then heat processed, as was described in U.S. Pat. No. 3,573,947. Other suitable accelerators include potassium sulfate and "HRA" which comprises calcium sulfate dihydrate freshly ground with sugar at a ratio of about 5 to about 25 pounds of sugar per 100 pounds of calcium sulfate dihydrate, as described in U.S. Pat. No. 2,078,199. Other accelerators for controlling a setting reaction in a gypsum slurry include wet gypsum accelerator (WGA) as described in U.S. Pat. No. 6,409,825. Typically, a set accelerating agent can be used in any amount suitable for controlling the rate of a calcined gypsum hydration. Preferably, the gypsum slurry according to this disclosure may comprise from about 0.1% to about 4% of one or more accelerating agents (accelerators), e.g., HRA or CSA, by weight of calcined gypsum, and more preferably from about 0.5% to about 2% of one or more a set accelerating agent by weight of calcined gypsum.

Suitable set retarding agents delay a hydration reaction of calcined gypsum. Such set retarding agents may include, but are not limited to, commercially available protein retarder SUMA, diethylenetriamine pentaacetic acid (DTPA), tartaric acid, citric acid, maleic acid or salts thereof, including in particular sodium citrate and/or potassium bitartrate (cream of tartar), or any combination thereof. A set retarding agent can be used in a small amount, for example in an amount in the range from about 0.01% to about 1.5% by weight of calcined gypsum, preferably in an amount in the range from about 0.05% to about 0.5% by weight of calcined gypsum.

The gypsum panels according to this disclosure include those in which a gypsum core is formed from a gypsum slurry contacted with foam. These are light-weight gypsum cores and gypsum panels which may include those formed from a gypsum slurry mixed with a foaming agent supplied as a foam from a foam generator, as for example was described in U.S. Pat. Nos. 5,643,510 and 5,683,635, the disclosures of which are incorporated by reference.

Gypsum slurries mixed with a foam may produce a gypsum core comprising air voids. Some gypsum cores according to this disclosure may contain air voids. Some gypsum cores according to this disclosure may contain air voids with a diameter in the range from about 75 micrometers to about 300 micrometers. A diameter of voids on average, an average number of voids per a cubic foot of the gypsum core and the distribution of the voids through the thickness of the gypsum core can be adjusted as may be needed for maintaining the targeted gypsum core density and strength by adjusting a blending ratio of a stable foaming agent comprising an alkyl chain containing between 8 and 12 carbons and an ethoxy group having a length of 1 to 4 units (stable soap) to an unstable foaming agent comprising unethoxylated soap with an alkyl chain length of 6 to 16 carbon units (unstable soap). It should be further appreciated that at least in some other embodiments suitable gypsum cores with air voids according to this disclosure can be made without co-blending stable and unstable foaming agents and/or only one type of the foaming agent, e.g., stable soap, can be used. Suitable foaming agents may comprise stable soap, unstable soap, or any combination hereof.

Various commercially available foaming agents can be used, including, but not limited to, foaming agents (surfactants, soaps) comprising sodium dodecyl sulfate, magnesium dodecyl sulfate, ammonium dodecyl sulfate, potassium dodecyl sulfate, sodium decyl sulfate, alkoxylated alkyl sulfate surfactants, sodium laureth sulfate, potassium laureth sulfate, magnesium laureth sulfate, ammonium laureth sulfate, or any mixtures thereof.

In some embodiments, a foaming agent or any blend of foaming agents may be used in any suitable amount to produce a gypsum core with a desired density and strength. In some embodiments, from about 0.01% to about 0.5% of a foaming agent can be used by weight of calcined gypsum.

The gypsum core according to this disclosure may comprise one or more water-repellent agent. Such agents may include siloxane. In these embodiments, a polymerizable siloxane, preferably as an emulsion with may comprise an emulsifying agent, may be added to a gypsum slurry. In order improve polymerization of siloxane, a catalyst can be also added to the gypsum slurry. Suitable siloxane formulations and catalysts such as magnesium oxide, Class C fly ash, dead-burned magnesium oxide as disclosed in U.S. Pat. Nos. 7,892,472 and 7,803,226, the entire disclosures of which are herein incorporated by reference.

Preferred siloxanes include a fluid polymerizable linear siloxane comprising a repeating unit with the general formula $R_2SiO$, wherein each of the two Rs independently represents a saturate or unsaturated mono-valent hydrocarbon radical or hydrogen. Preferably, siloxane is a hydrogen-modified siloxane. Most preferably, a siloxane is an alkyl hydrogen siloxane, and most preferably, methyl hydrogen siloxane. In some embodiments, a gypsum core may comprise siloxane in an amount from about 0.3% to about 2% by weight of calcined gypsum.

Some preferred embodiments of the gypsum panel according to this disclosure comprise cover sheets which are shown as elements 14 and 16 in FIG. 1. Suitable cover sheets include, but are not limited to a glass mat, e.g., an unwoven fiberglass mat and/or a paper cover sheet. One or both cover sheets may comprise cellulosic fibers, glass fibers, ceramic fibers, mineral wool, or any combination thereof. A cover sheet can be of any suitable thickness with some non-limiting examples being in the range from about 0.014 inches to about 0.022 inches.

One or both sheets may be individual sheets or a laminated cover sheet comprising more than one sheet. In some preferred embodiments, the cover sheets are paper cover sheets. Examples of a paper cover sheet include, but are not limited to, cover sheets comprising Manila paper, kraft paper and/or newsline paper. A multi-ply paper can be used, e.g., Manila heavy paper and MH Manila HT (high tensile) paper.

A face paper cover sheet and a back paper cover sheet may be made from different paper grades and each of the cover sheets may be of different weight. Suitable weight ranges may include in the range from about 33 lbs/MSF to about 65 lbs/MSF. For example, a face cover sheet may comprise manila paper of high density, preferably about 55 to about 65 lb/msf, but a paper cover sheet of different weight can be used as well. Newsline paper of lower density of about 35 to about 45 lbs/msf can be used as back cover sheet.

In some embodiments, one or both cover sheets may have a coating on the cover sheet surface which is not attached to the gypsum core. A coating can comprise a material which makes the surface suitable for various applications such as for example as in floor underlayment, in a roof assembly, as a tile backing, as an exterior sheathing, becoming mold and/or water-resistant, among others.

In some preferred embodiments, the gypsum panel according to this disclosure may have a gypsum core having a density of from about 30 pcf to 40 pcf. Such gypsum panels can be formulated from a gypsum slurry comprising from about 1100 lbs/msf to about 1700 lbs/msf of calcined gypsum for a ⅝ inch thick panel, ammonium-exchange vermiculite in an amount from about 2% to about 10% by weight of calcined gypsum, one or more starches in an amount from about 0.3% to about 3% by weight of calcined gypsum, mineral and/or glass fibers in an amount from about 0.3% to about 0.5% by weight of calcined gypsum, a phosphate compound in an amount from about 0.05% to about 0.4% by weight of calcined gypsum, water with the WSR ratio in the range from about 0.5 to about 1.5, and one or more of set retarding agents and one or more of set accelerating agents. Other additives, e.g., a dispersant and/or a foaming agent, may be also incorporated as needed. A gypsum core may contain air voids produced by mixing a gypsum slurry with foam.

Figure 2:
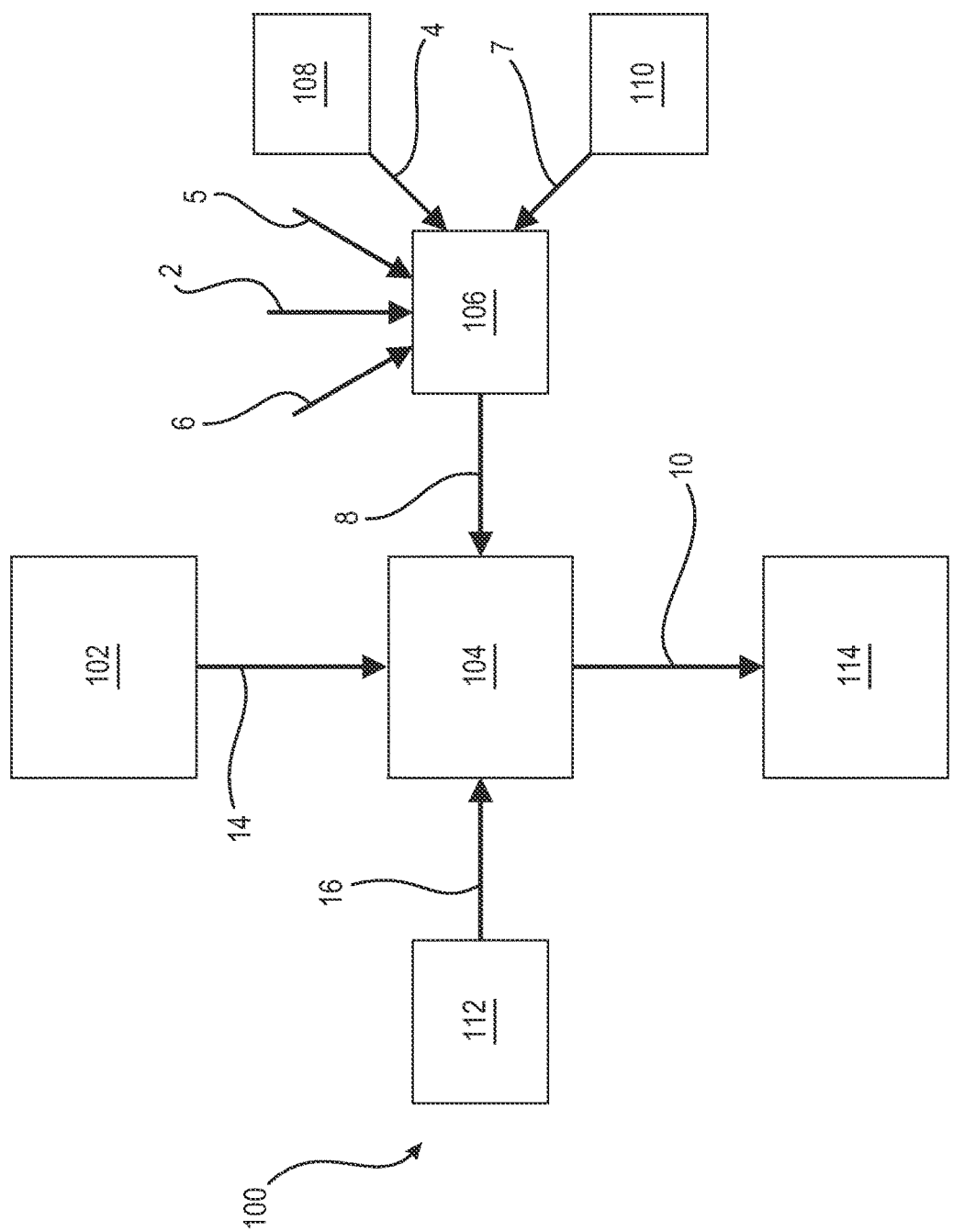
FIG. 2 is a schematic representation of one embodiment for a method according to this disclosure for manufacturing a gypsum panel having a gypsum core comprising set gypsum and ammonium-exchanged vermiculite.

In further embodiments, this disclosure provides methods for manufacturing a gypsum panel according to this disclosure. Referring to FIG. 2 which is a schematic representation of one embodiment for a method according to this disclosure for manufacturing a gypsum panel having a gypsum core comprising set gypsum and ammonium-exchanged vermiculite, generally 100, the method may comprise feeding a first (face) cover sheet 14 from a first roll 102 onto a moving conveyor 104. Feeding calcined gypsum (and optionally other dry additives) 2 and water (and optionally liquid additives) 6 in a mixer 106 which can be a pin-mixer. Suitable mixers are known in the art including those comprising one or more feed inlets opening into a main mixing chamber (body) connected to a discharge conduit, for example as described in U.S. Pat. Nos. 6,494,609 and 6,874,930, the entire disclosures of which are herein incorporated by reference.

Feeding into the mixer 106 via one more feed inlets wet and/or dry ammonium-exchanged vermiculite 4 produced by ammonium-exchanging vermiculite in a solution containing one or more of ammonium salts, ammonium hydroxide and/or urea in a vessel 108. In alternative to the ammonium-exchanged vermiculite 4 or in addition to the ammonium-exchanged vermiculite 4, feeding to the mixer 106 vermiculite and one or more ammonium salts, ammonium hydroxide and/or urea 5. Mixing the dry and wet components in the mixer 106 into a gypsum slurry 4 discharging from a discharge conduit of the mixer 106.

If a gypsum slurry 4 to be foamed, a foam generator 110 may be used to foam one or more foaming agents into foam 7 which may be added to the gypsum slurry 4 either directly to the chamber of the mixer 106 or while the gypsum slurry 4 is in a discharge conduit of the mixer 106.

The gypsum slurry 4 is deposited and distributed (spread) on the face cover sheet 14 moving on the conveyor 104. The face cover sheet 14 may be coated with a skim coat slurry comprising a denser gypsum slurry on the inner surface prior to the gypsum slurry 14 being distributed on the cover sheet 14. The edges of the face cover sheet 14 may be folded upward from the surface of the conveyor 104 in order to keep the gypsum slurry 4 in place while the gypsum slurry 4 is hardening.

After the gypsum slurry 4 is spread on the face cover sheet 14, the gypsum slurry 4 is covered with a back cover sheet 16 fed to the conveyor 104 from a second roll 112. This gypsum panel assembly, known as a continuous ribbon of a gypsum panel precursor, is conveyed to a forming station of the conveyor 104 wherein the gypsum panel assembly is sized to a desired thickness by a forming plate of the conveyor 104. Next, the gypsum panel assembly is cut into gypsum panels 10 of desired length (e.g., 4'×8', 4'×10' or 4'×12' or some other width and/or length) at the knife section of the conveyor 104.

A gypsum panel 10 exits the conveyor 104 and may be moved into a kiln 114 wherein the gypsum panel 10 continues to harden as the gypsum core 12 continues to set and harden at an elevated temperature, e.g., in the range from about 110° F. to about 550° F.

In yet another embodiment, the present disclosure relates to a building assembly comprising one or more gypsum panels 10 as well as methods for constructing the assembly. In an assembly according to this disclosure, a gypsum panel may be attached to a suitable substrate. Examples of a suitable substrate include, but are not limited to, a load-bearing and non-load bearing wood or steel frame constructed of framing members (studs). Other examples of substrate include, but are not limited to, a concrete substrate, a metal sheet, one or more of wood plunks, a brick wall, etc.

The gypsum panel may be attached to the substrate by any method and with any means typically used in the field for a particular application and a particular frame. Non-limiting examples include attaching the gypsum panel to the frame members with one or more of a screw, a bolt, a fastener, or any combination thereof. Non-limiting examples of a building assembly according to this disclosure include, but are not limited to, an interior wall, an exterior wall, a ceiling, a roof, a column or a floor, a tile backing. The gypsum panels according to this disclosure may be used in commercial or residential applications, including in new construction or repair and remodeling. In the assembly, a gypsum panel may be used as a substrate surface to which one or more coatings, tiles, shingles or any other surface finishing materials are then applied.

Non-limiting examples of wall assemblies include those described in U.S. Pat. No. 9,249,578, the entire disclosure of which is herein incorporated by reference.

Figure 3:
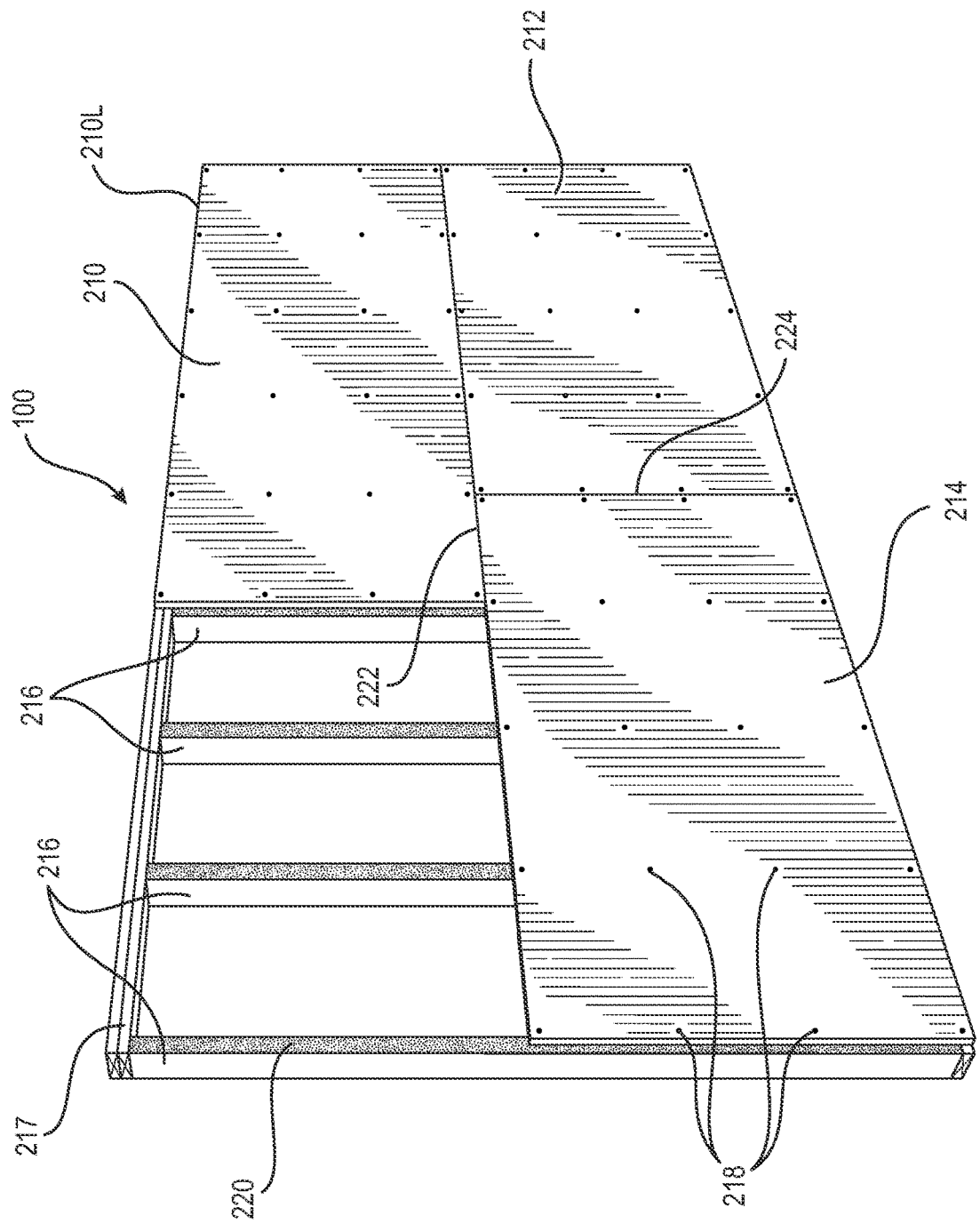
FIG. 3 is a perspective view of one embodiment of a building assembly according to this disclosure. This illustration is not drawn to scale.

FIG. 3 depicts one embodiment of a wall assembly according to this disclosure, generally 200, comprising three gypsum panels according to this disclosure 210, 212, and 214 attached (affixed) to framing members (studs) 216 of the frame 217 with fasteners 218. One Some or all of the framing members 216 may be coated with adhesive 220 in order to improve attachment of the gypsum panels to the frame. The gypsum panels 210, 212 and 214 abut, creating seams (joints) such 222 along their long edges and also seams (joints) along their short edges, e.g. 224.

A gypsum panel assembly according to this disclosure meets the requirements for fire resistant assemblies when tested in a fire resistance test in accordance with ASTM E 119. These gypsum panels may satisfy at least ¾ hour fire rating pursuant to the fire containment and structural integrity procedures and standards U 419.

Gypsum panels according to this disclosure include those which are classified as type X board under ASTM 1396/C 1396M-06 because these gypsum panels can be used in an assembly in accordance with ASTM 1396/C 1396M-06 which inhibits transmission of heat through the assembly and meet a one-hour fire-resistance rating. Other fire-rating tests may include one or more of the following tests from Underwriters Laboratories (UL), including UL tests U305, U419, and U423.

A further description will now be provided by the following non-limiting examples.

Example 1. Preparation of Ammonium-Exchanged Vermiculite

A beaker containing 100 g of vermiculite, 100 g of water, and various ammonium salts as listed in Table 2 was placed on the shaker with a speed of 100 rpm. Samples were incubated with shaking for 5, 10 or 480 minutes as noted in Table 2. After incubation was completed, ammonium-exchanged vermiculite was filtered and dried at 110° F. for 12 hours. Then, a thermal expansion test was conducted following the UL follow-up procedure at 850° C. and in accordance with ASTM C 1795-15, wherein the gypsum core is heated at about 1560° F. (850° C.) for one hour. The results of this test are reported in Table 2 below.

TABLE 2

Thermal expansion of vermiculite after $NH_4$-exchanged process

| Vermiculite Grades | Sample ID | $NH_4H_2PO_4$ (ADP) (g) | $(NH_4)_2SO_4$ (g) | $(NH_4)_2HPO_4$ (AMP) (g) | Shaking Time (min) | Volume Expansion % |
|---|---|---|---|---|---|---|
| #4 | 4-0 | 0 | 0 | 0 | 10 | 285 |
|  | 4-1 | 15 |  |  | 10 | 330 |
|  | 4-2 | 5 |  |  | 10 | 325 |
|  | 4-3 | 2 |  |  | 10 | 310 |
|  | 4-4 |  | 15 |  | 10 | 325 |
|  | 4-5 |  | 5 |  | 10 | 320 |
|  | 4-6 |  |  | 5 | 10 | 320 |
|  | 4-7 | 1.5 | 3.7 |  | 30 | 325 |
|  | 4-8 | 1.4 | 3.6 |  | 10 | 325 |
|  | 4-9 | 1.5 | 3.7 |  | 5 | 320 |
| #4/5 Mixture | 4/5-0 | 0 | 0 | 0 | 10 | 260 |
|  | 4/5-1 | 5 |  |  | 10 | 315 |
|  | 4/5-2 | 1.4 | 3.6 |  | 10 | 315 |

As can be seen in Table 2, when vermiculite is ion-exchanged in an ammonium salt solution, such as for example as ammonium dihydrogen phosphate (ADP), ammonium monohydrogen phosphate (AMP), or ammonium sulfate, its thermal expansion percentage is greatly improved. An ion-exchanging time and a salt concentration may affect a thermal expansion result. One optimized ion-exchanging time is at about 10 minutes with the ratio of water to vermiculite being 1 to 1, and the ammonium salt concentration being 5%.

Example 2. Preparation of Fire-Rated Wallboard 2.1 Addition of Dried NH4-Vermiculite into a Gypsum Slurry This process comprises two steps.

Step 1: Vermiculite is ion-exchanged in an ammonium salt solution for 10 minutes, then filtered and dried at 110° F.; and Step 2: Dried $NH_4$-vermiculite is added to a gypsum slurry to make wallboard. The filtered liquid can be recycled and used again for preparing the next batch of ammonium-exchanged vermiculite.

Table 3 reports one formula for making a ⅝ inch fire-rated wallboard. Vermiculite can be used either as vermiculite (control board) or as $NH_4$-exchanged vermiculite (invention board). A control board contains 50 lbs/msf of Grade 4 vermiculite. In order to prepare a gypsum slurry, dry additives containing vermiculite (control) or $NH_4$-exchanged vermiculite (invention) were soaked in a solution containing water and wet additives for 10 seconds and blended for 10 seconds in a Hobart mixer, then foam was injected for 13 seconds and mixing continued for another 2 seconds. Finally, a gypsum slurry was poured into a 12"×12"×⅝" envelope.

TABLE 3

Formula for ⅝" ULIX board

| 12" × 12" × ⅝" | Board Weight (g) | Convert to Board Weight (lbs/msf) |
|---|---|---|
| Stucco (g) | 900 | 1450 |
| HRA (g) | 9 | 14.5 |
| Corn Starch (g) | 5 | 8.1 |
| Fiber Glass (g) | 4.65 | 7.5 |
| $NH_4$-Vermiculite (g) | 31 | 50 |
| STMP (g) | 0.9 | 14.5 |
| Retarding Agent (g) | 0.1 | 0.16 |
| Dispersant (g) | 2 | 3.2 |
| Water (g) | 870 | 1410 |
| Air flow (L/min) | 40 |  |
| Soap flow (L/min) | 5 |  |
| Foam time (sec) | 13 |  |
| Board Weight | 1152 | 1856 |

After a gypsum slurry was set and hardened, an envelope was sealed by using a paper tape. A sealed board was dried at 450° F. for 15 mins, then it was moved to 360° F. After the board was dried at 360° F. for 15 mins, the board was dried at 110° F. overnight.

Six of the 4" discs were cut from each of dried boards (control and invention) and burnt at 850° C. for a thermal shrinkage test Each sample was weighed and the X-Y diameter and the Z-thickness of each board were measured before and after the exposure to heat. The X-Y and Z-shrinkage results are shown in Table 4.

TABLE 4

X-Y % and Z-% thermal shrinkage from different types of ammonium-exchanged vermiculite.

| Vermiculite Type | $NH_4$-salt type | Vermiculite lbs/msf | Board Weight (lbs/msf) | X-Y % | Z-% |
|---|---|---|---|---|---|
| 4-0 | None | 50 | 1796 | 3.54 ± 0.31 | 5.15 ± 0.56 |
| 4-2 | ADP | 50 | 1778 | 3.01 ± 0.42 | 3.03 ± 0.35 |
| 4-5 | $(NH_4)_2SO_4$ | 50 | 1780 | 3.27 ± 0.41 | 3.54 ± 0.42 |
| 4-8 | ADP-$(NH_4)_2SO_4$ | 50 | 1782 | 3.08 ± 0.52 | 3.43 ± 0.98 |
| 4/5-0 | None | 50 | 1782 | 3.93 ± 0.43 | 6.22 ± 0.39 |
| 4/5-1 | AMP | 50 | 1793 | 3.45 ± 0.50 | 5.02 ± 0.43 |
| 5-0 | None | 50 | 1771 | 4.43 ± 0.24 | 7.74 ± 0.67 |
| 5-1 | AMP | 50 | 1769 | 3.95 ± 0.52 | 5.52 ± 0.73 |

As can be seen in Table 4, after the ammonium ion-exchanged treatment, use of dried $NH_4$-exchanged vermiculite decreased a board shrinkage, particularly the Z-% shrinkage. The Z-% shrinkage from 5-1 and 4/5-1 vermiculite is similar to that from 4-0 vermiculite, which means that the same amount of Grade 4/5 mixture or Grade 5 can be used to replace Grade 4 vermiculite after the $NH_4$-ion exchange process.

2.2 Addition of Wet $NH_4$-Vermiculite into a Gypsum Slurry

Slurry Process: vermiculite was ion-exchanged in an ammonium salt solution for 10 minutes, then both the $NH_4$-vermiculite and the solution were poured into a gypsum slurry to make wallboard. A gypsum slurry was formulated as shown in Table 3 and a gypsum board was prepared as discussed in section 2.1. Control and invention boards were tested in a thermal shrinkage test as described in section 2.1

Table 5 reports the X-Y and Z-shrinkage results for boards made with wet ammonium-exchanged vermiculite produced by the slurry process.

TABLE 5

The X-Y and Z-shrinkage results

| Grade | NH$_4$-salt | Vermiculite lbs/msf | Board Weight (lbs/msf) | X-Y % | Z-% |
|---|---|---|---|---|---|
| 4-0 | none | 50 | 1842 | 3.48 ± 0.25 | 5.21 ± 0.69 |
| 4-0 | none | 43.5 | 1832 | 4 06 ± 0.52 | 7.03 ± 0.55 |
| 4-8 | ADP-(NH$_4$)$_2$SO$_4$ | 43.5 | 1827 | 3.63 ± 0.43 | 5.55 ± 0.65 |
| 4/5-2 | ADP-(NH$_4$)$_2$SO$_4$ | 50 | 1834 | 3.65 ± 0.55 | 5.01 ± 0.87 |

As reported in Table 5, the use of NH$_4$-vermiculite produced by the slurry process decreased board shrinkage, particularly the Z-% shrinkage.

Specifically, the Z-% shrinkage from 43.5 lbs/MSF of NH$_4$-vermiculite (Sample 4-8) was similar to the Z-% shrinkage from 50 lbs/MSF of as-is Grade 4 vermiculite. Thus, the total usage of vermiculite was reduced by 13% In addition, the Z-% shrinkage from 50 lbs/MSF of NH$_4$-exchanged 4/5 mixture (Sample 4/5-2) was similar to that from 50 lbs/MSF of Grade 4 (Sample 4-0), indicating that the same amount of the NH$_4$-exchanged 4/5 mixture can replace grade 4 vermiculite.

Filtration Process. After vermiculite was ion-exchanged in an ammonium salt solution for 10 minutes, the NH$_4$-vermiculite was separated from the slurry by filtration. The filtered NH$_4$-exchanged vermiculite was added into a gypsum slurry to make wallboard according to the formula listed in Table 3 and the rest of the ammonium salt solution was recycled for the next NH$_4$-ion exchanging process. Wallboards were made and tested as described in section 2.1.

Table 6 reports the X-Y and Z-shrinkage results for wallboards prepared with ammonium-exchanged vermiculite prepared by the filtration process.

TABLE 6

X-Y % and Z-% thermal shrinkage from different types of vermiculite

| Grade | NH$_4$-salt | Vermiculite lbs/msf | Board Weight (lbs/msf) | X-Y % | Z-% |
|---|---|---|---|---|---|
| 4-0 | none | 50 | 1842 | 3.48 ± 0.25 | 5.21 ± 0.69 |
| 4-2 | ADP | 40 | 1851 | 3.61 ± 0.22 | 5.63 ± 0.60 |
| 4-8 | ADP-(NH$_4$)$_2$SO$_4$ | 45 | 1839 | 3.03 ± 0.17 | 5.06 ± 0.38 |

As can be seen in Table 6, when wet NH$_4$-exchanged vermiculite was added into a gypsum slurry, the Z-% shrinkage from 40 or 45 lbs/MSF of NH$_4$-exchanged vermiculite was similar to the Z-% shrinkage from 50 lbs/MSF of as-is Grade 4 vermiculite. Accordingly, less vermiculite can be used if vermiculite is ammonium-exchanged.

2.3 In-Situ Process

Ammonium salts (powder or liquid form) were mixed with a gypsum slurry containing vermiculite to make a gypsum board. Thus, there was no separate ion-exchanging process. Instead, an ion-exchange process was combined with mixing a gypsum slurry.

1.12 gram of (NH$_4$)$_2$SO$_4$ and 0.43 gram of ADP were added to a gypsum slurry prepared according to the formula of Table 3. Wallboards were prepared as discussed in section 2.1 and tested for thermal shrinkage as discussed in section 2.1. Results from these tests are reported in Table 7.

TABLE 7

X-Y % and Z-% thermal shrinkage from the In-Situ Process

| Grade | NH$_4$-salt | Vermiculite lbs/msf | Board Weight (#/msf) | X-Y % | Z-% |
|---|---|---|---|---|---|
| 4-0 | none | 50 | 1807 | 3.33 ± 0.12 | 5.47 ± 0.36 |
| 4-0 | (NH$_4$)$_2$SO$_4$ | 50 | 1789 | 3.21 ± 0.43 | 4.09 ± 0.S4 |

Table 7 reports results for the thermal X-Y and Z-shrinkage from the In-Situ Process. When an ammonium salt together with vermiculite is added to a gypsum slurry, though a mixing time is limited, a resulting wallboard still shows a better thermal shrinkage performance than the one without adding an ammonium salt and formulating a wallboard with ammonium-exchanged vermiculite.

Table 8 reports another formula for making a ⅝ inch fire-rated wallboard, now without STMP. NH$_4$-exchanged vermiculite is dried NH$_4$-exchanged vermiculite as was used in Table 3.

TABLE 8

Formula for ⅝" ULIX board

| 12" × 12" × ⅝" | Board Weight (g) | Convert to Board Weight (lbs/msf) |
|---|---|---|
| Stucco (g) | 900 | 1450 |
| HRA (g) | 9 | 14.5 |
| Corn Starch (g) | 5 | 8.1 |
| Fiber Glass (g) | 3.0 | 4.8 |
| NH$_4$-Vermiculite (g) | 31 | 50 |
| STMP (g) | 0 | 0 |
| Retarding Agent (g) | 0.1 | 0.16 |
| Dispersant (g) | 2 | 3.2 |
| Water (g) | 870 | 1410 |
| Air flow (L/min) | 40 | |
| Soap flow (L/mib) | 5 | |
| Foam time (sec) | 13 | |
| Board Weight | 1089 | 1755 |

Table 9 reports the X-Y and Z-shrinkage results for boards made with dried ammonium-exchanged vermiculite and according to the formula of Table 8.

TABLE 9

| Grade | NH$_4$-salt | Vermiculite lbs/msf | Board Weight (lbs/msf) | X-Y % | Z-% |
|---|---|---|---|---|---|
| 4-0 | none | 50 | 1745 | 3.94 ± 0.37 | 5.89 ± 0.76 |
| 4-8 | ADP-(NH$_4$)$_2$SO$_4$ | 50 | 1742 | 3.06 ± 0.71 | 5.03 ± 0.45 |

Table 9 reports results for the samples without STMP. When ammonium-exchanged vermiculite is added to a gypsum slurry, a resulting wallboard still shows a better thermal shrinkage performance than the one without having ammonium-exchanged vermiculite.

We claim:

1. A gypsum panel having a gypsum core comprising set gypsum and ammonium-exchanged vermiculite,
   wherein the gypsum core has a width (x), a length (y) and a thickness (z),
   wherein the length (y) and the width (x) are greater than the thickness (z),
   wherein the length (y) is greater than the width (x), wherein the gypsum core has two long surfaces, a first long surface of a width-length (x-y) area and an opposite second long surface of the width-length (x-y) area, and wherein each of the two long surfaces has four edges, including a first long edge of the length (y) and a second long edge of the length (y), the second long edge being opposite to the first long edge;

wherein the gypsum core has been formed from a gypsum slurry, said gypsum slurry having a water-to-stucco ratio from 0.5 to 1.5; and wherein said gypsum slurry comprises:
a) water,
b) calcined gypsum in an amount from 40% to 70% by weight of the slurry,
c) ammonium-exchanged vermiculite in an amount from 2% to 10% by weight of calcined gypsum or vermiculite in an amount from 2% to 10% by weight of calcined gypsum in combination with one or more of ammonium salt, ammonium hydroxide or urea in a weight ratio to said vermiculite ranging from 1:5 to 1:50, and
d) one or more additives.

2. The gypsum panel of claim 1, wherein the gypsum core contains ammonium-exchanged vermiculite of Grade 4, Grade 5, or any combination thereof.

3. The gypsum panel of claim 1, wherein the gypsum core is covered on at least one of the two long surfaces with a cover sheet.

4. The gypsum panel of claim 1, wherein the gypsum core is covered on the first long surface with a first paper cover sheet and the gypsum core is covered on the second long surface with a second paper cover sheet, and wherein the first paper cover sheet and the second paper cover sheet are attached to the gypsum core.

5. The gypsum panel of claim 1, wherein the gypsum core has the thickness (z) of ⅝ inch, and wherein the gypsum core has less than 5% thermal shrinkage in the z-direction, as measured in a thermal shrinkage test conducted in accordance with ASTM C 1795-15 at 850° C. for one hour.

6. The gypsum panel of claim 1, wherein the gypsum panel is fire rated.

7. The gypsum panel of claim 1, wherein the gypsum core has a density in the range from 30 pounds per cubic foot (pcf) to 40 pounds per cubic foot (pcf).

8. The gypsum panel of claim 1, wherein at least two long edges of the gypsum core are tapered.

9. The gypsum panel of claim 1, wherein the gypsum panel has the thickness (z) in range from ¼ inch to 1 inch.

10. The gypsum panel of claim 1, wherein the gypsum panel is fire-resistant wallboard with a thermal insulation index (TI) of at least 20 minutes, as measured in accordance with ASTM C 1795-15.

11. The gypsum panel of claim 1, wherein the one or more additives include starch, fibers, a dispersant, a foaming agent, a set accelerating agent, a phosphate compound, a set retarding agent or any combination thereof.

12. The gypsum panel of claim 1, wherein the gypsum slurry contains one or more of a foaming agent, water repellant or any combination thereof.

13. The gypsum panel of claim 1, wherein the gypsum core contains air voids.

14. A method for making a gypsum panel having a gypsum core comprising set gypsum and ammonium-exchanged vermiculite, the method comprising:
a) mixing a gypsum slurry with calcined gypsum, water and additives;
b) adding to the gypsum slurry ammonium-exchanged vermiculite or adding to the gypsum slurry vermiculite and one or more of ammonium salt, ammonium hydroxide and/or urea;
c) depositing the gypsum slurry on a first cover sheet; and
d) covering the deposited gypsum slurry with a second cover sheet; and wherein the method further comprises before step b), ion-exchanging vermiculite in a solution comprising one or more of ammonium salt, ammonium hydroxide and/or urea and thereby obtaining ammonium-exchanged vermiculite.

15. The method of claim 14, wherein after the ion-exchanging reaction is completed, the method further comprises one or more of the following: separating ammonium exchanged vermiculite from the solution and/or drying ammonium-exchanged vermiculite.

16. The method of claim 14, wherein the additives include one or more of the following: starch, foam, fibers, a dispersant, a phosphate compound, a set retarding agent, a set accelerating agent, or any combination thereof.

17. The method of claim 14, wherein the first cover sheet and/or the second cover sheet are paper cover sheets.

18. A wall or ceiling assembly comprising at least one gypsum panel of claim 1, wherein the gypsum panel is attached to a substrate.

* * * * *